United States Patent [19]

Fenton et al.

[11] 4,150,259

[45] Apr. 17, 1979

[54] COMMUNICATION SYSTEM CONFERENCING ARRANGEMENT

[75] Inventors: Francis M. Fenton, Middletown; James H. Van Ornum, Hazlet; Tse L. Wang, Matawan; Carl D. Weiss, Little Silver, all of N.J.

[73] Assignee: Bell Telephone Laboratories, Incorporated, Murray Hill, N.J.

[21] Appl. No.: 847,216

[22] Filed: Oct. 31, 1977

[51] Int. Cl.² .............................................. H04M 3/56
[52] U.S. Cl. ................................................ 179/18 BC
[58] Field of Search ................................... 179/18 BC

[56] References Cited

U.S. PATENT DOCUMENTS 3,991,279  11/1976  Morgan et al. ................. 179/18 BC
4,046,972  9/1977  Huizinga et al. ...................... 179/99

Primary Examiner—William C. Cooper
Attorney, Agent, or Firm—David H. Tannenbaum

[57] ABSTRACT

A communication conferencing arrangement is disclosed which relies upon the use of a plus/minus (+/−) nonlocking button followed by the operation of a button associated with any other line appearing at the station. If the operated line button is associated with a currently active line that line will be removed from the conference. If, however, the operated button is associated with a nonactive line (held or idle) then that line will be added, in conference fashion, with the communication leads of the enabling station. Provision is made to allow any number of added connections up to a preset maximum number at any station.

11 Claims, 8 Drawing Figures

FIG. 4

| STATION STATUS | SWITCH HOOK | +/- BUTTON | SS |

| STATION BUTTON STATUS | STATUS LED ON/OFF/WINK/FLASH | SBS |

| STATION BUTTON I-USE | I-USE ON/OFF | SBI |

| STATION BUTTON LINK POINTER | GROUP NUMBER | LINK NUMBER | SBLP |

| STATION BUTTON IDENTIFICATION (TRANSLATION) | BUTTON TYPE IDENTIFICATION | SBID |

FIG. 5
NLST: LIST OF CONFEREES ON A LINK

| | ID NUMBER OF A FACILITY CONNECTED TO THE LINK | IDENTIFY TO WHICH GROUPS THIS FACILITY BELONGS |
|---|---|---|
| SLOT 1 | | |
| SLOT 2 | " | " |
| SLOT 3 | " | " |
| SLOT 4 | " | " |
| SLOT 5 | " | " |

COMMUNICATION SYSTEM CONFERENCING ARRANGEMENT

BACKGROUND OF THE INVENTION

This invention relates to communication system call conference control arrangement and more particularly to an arrangement for controlling conference calls in a stored program controlled communication system.

Problems exist in telephone communication systems when it is desired to establish conferences between more than two stations. Primarily, these problems arise from the desire to allow any station to have the ability to add on an additional station to an existing calling connection without the use of externally provided assistance. In some presently known systems the station user flashes the switchhook to obtain operator assistance when such a conference is desired. When a new party is to be added or when a party is to be removed from the conference the assistance of the attendant is required. This is both time consuming, inefficient and not always practical.

In other known systems conferencing can be established under control of one of the parties to the call by first flashing the switchhook, obtaining dial tone, dialing the desired number and then flashing the switchhook to bridge the two calling connections. Once such a bridging occurs, it is difficult to separate the parties. When more than three parties have been involved in a conference the problems become compounded. If a flash is too long, parties may be inadvertently dropped.

Thus it is desired and it is a general object of our invention to arrange a communication system with conference establishing control such that any station, without external assistance, may set up (add) or tear down (subtract) a conference with any number of other parties up to a preset maximum, easily, efficiently, and without confusion.

SUMMARY OF THE INVENTION

One of the buttons on the telephone set is designated as a plus-minus (+/−) button and is used to add or to subtract additional parties to a calling connection at that telephone station. Thus if a station is active on an outside line (or a system access line) a third party on any other line appearing at the station can be added to the station in conference fashion simply by operating the +/− button followed by the operation of a button associated with the line to be added. In similar fashion a party is deleted from a conference again by depressing the +/− button followed by depression of a button associated with an active line. The active line is then disconnected from the conference. The +/− button operates to add as many stations to the conference as had been priorly authorized for the system.

BRIEF DESCRIPTION OF THE DRAWINGS

The foregoing features and objectives together with the operation and utilization of the present invention will be more apparent from the following description, taken in conjunction with the drawing, in which:

FIG. 4 shows a chart of station data structure used to implement the system operations.

FIG. 5 shows a chart of link data structure used to implement the system operations.

GENERAL DESCRIPTION—BACKGROUND

Before beginning a general discussion of the specific features claimed it may be helpful to review in general terms the operation of an overall system in which the claimed feature can be utilized. It should be borne in mind that such a feature can be used in any number of similar type systems and thus background information on only one type of system will be presented. In addition, since communication system features may be used with different types of systems each dependent on different hardware constraints and upon different programming techniques, no attempt will be made to detail all of the steps used to control the overall system, as such would cloud the issue and unnecessarily lengthen this specification. Quantities mentioned were engineered for particular time and memory requirement and will not be the optimum for all such systems.

It will be of course be obvious to one skilled in the art that in order for the feature described and claimed herein to be used with any communication system, the feature must be blended into the overall structure of the system in which it is used and must be tailored to mesh with all of the other features and operations of such a system. Thus, in order to avoid confusion and in order to allow those skilled in the art to utilize the invention claimed herein, this patent specification will concentrate on providing an understanding of the problems and constraints typically found in a communication system where the feature may be used. The patent specification will provide the necessary logical steps necessary for the implementation and blending of the described feature into such a larger system, having many such features.

This patent specification is being filed concurrently with three other patent specifications, each directed to a different operational feature of a communication system. These patent applications are Allison et al., Ser. No 847,214, filed on Oct. 31, 1977, now U.S. Pat. No. 4,109,113, Fenton et al., Ser. No. 817,217, filed on Oct. 31, 1977, Nahabedian et al., Ser. No. 847,215, filed on Oct. 31, 1977 and are all incorporated by reference as though they were each reproduced in their entirety herein.

TYPICAL OVERALL SYSTEM OPERATION

Figure 1:
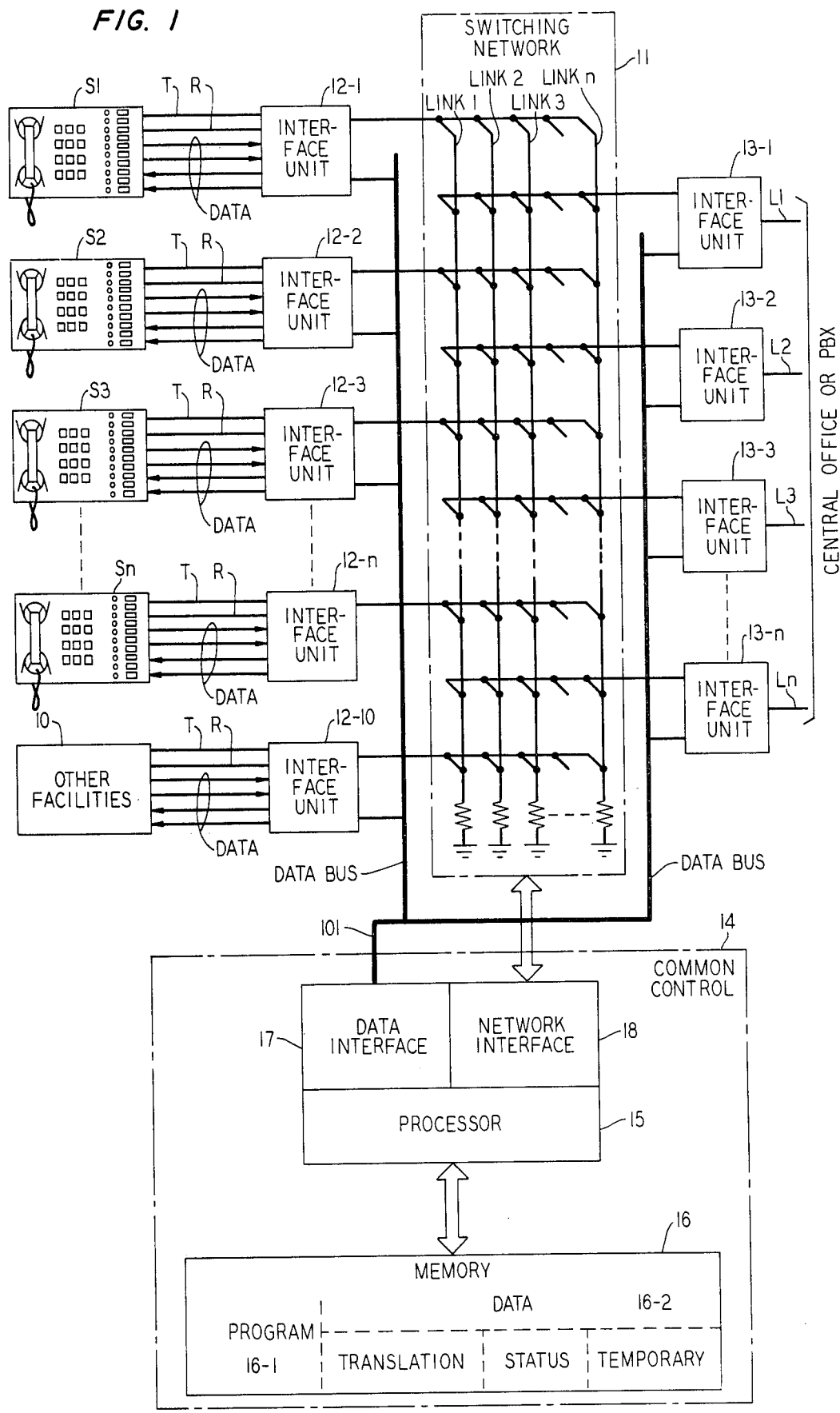
FIG. 1 shows an overall system configuration having several multibutton telephone stations.

One such communication system where the structure claimed herein can be used is a station oriented solid-state, stored program control, business communication system. FIG. 1 shows a block diagram of such a system which combines the usual key system features (hold, visual indication, etc.) with many new features not previously available.

Call processing in the system is under the control of microprocessor 15 in common control 14. Each station, such as Station S1, and line port, such as 13-1, is scanned to detect any changes in status. In response to any change (e.g., on-hook, off-hook, button depression, etc.), the processor, per instructions in the stored program in memory 16 translates these changes into system commands. The system also generates commands via a bidirectional data bus 101 to the multibutton electronic telephone (MET) set, shown in detail in FIG. 2, to light the light emitting diodes (LEDs) and ring the tone ringer associated with the MET set. All of the MET sets provide TOUCH-TONE dialing, tone ringing, and LED indications. The LED indicators will be discussed hereinafter. The tone ringer provides two distinctive audible signals—low-pitched tone ringing to indicate incoming CO calls and high-pitched tone ringing to indicate incoming station-to-station (intercom) calls.

Nonbutton key sets can be used as station positions where only station-to-station (intercom) calling and/or outward dialing, via dial access pooled facilities or a central answer position, are required. In this implementation the first (lower) 4 buttons on each MET station set are always the same. They are: Hold, +/−, and two system access buttons, each associated with the intercom number of the particular station. The system access buttons are used to receive calls from other stations within the communication system (intercom) and to originate such calls or to access system facilities such as lines, paging ports, etc. Incoming calls may terminate on either system access button depending on their busy/idle status. If the lower one is busy, a second incoming call comes to the second (upper) one, giving a visual call waiting indication accompanied by a single audible ring if the station is off-hook. The system access buttons are also used in conferencing and call transfer features, described in the aforementioned copending patent application Nahabedian et al. The remainder of the buttons on the MET station sets are flexible buttons and can be assigned to any of the button-activated station or answering position features, such as call coverage.

As shown in FIG. 1 there are three pairs of wires coming out of the electronic key telephone set to the interface unit: T&R, data in, data out. The T&R pairs are connected to switching network 11. In the example shown a space division network with n links is shown. It may be replaced by a time division network with n time slots. The data link between the set and the processor is used to transmit information to the processor which will configure the switching network and send LED control signals back to the telephone sets accordingly. System facilities, such as system facility 10, is understood to include origination registers, tone circuits, stations, lines, trunks or any port which can be communication coupled to a link of the network.

Common control 14 consists of processor 15, interface units 17 and 18 the memory 16. The memory unit consists of a program store 16-1, and a data store 16-2. The data store is subdivided into the following:

A. Translation which contains the hardware configuration data. For example, the button assignments and station class of service.
B. Status which stores the state of the system at a given moment. For the station, it contains
  (a) station state: switchhook; +/− operation; whether actively connected to the network or not.
  (b) button state: for each button
    (i) if I-USE is on
    (ii) what is the green status LED state
    (iii) which link is associated with calls on this button.
C. Temporary Data which is used to process a call and is a scratch-pad area.

A typical common control processor works on a 25 MS work cycle. A high level executive program, TSK-DSP, controls the order of tasks executed in a work cycle. At the beginning of each cycle, a hardware real time interrupt is received by the processor. The interrupt handling routine sets a flag and returns to the interrupted task which in turn will relinquish control to TSK-DSP control, as soon as it reaches a convenient break point. The task dispenser decides which task is to be executed next according to a schedule. Basically these tasks fall into three categories:

(1) Scan: Scan for physical changes (e.g., a new button depression by a station). If a change is detected and confirmed, it will be stored in a temporary buffer to be processed later.
(2) Process: After all scans are completed, changes will be processed.
(3) Maintenance: If there is time left in the 25 MS cycle, the system will perform routine maintenance functions until the next work cycle begins.

The following features can be implemented by the system discussed herein.

I-Use Indication

Figure 2:
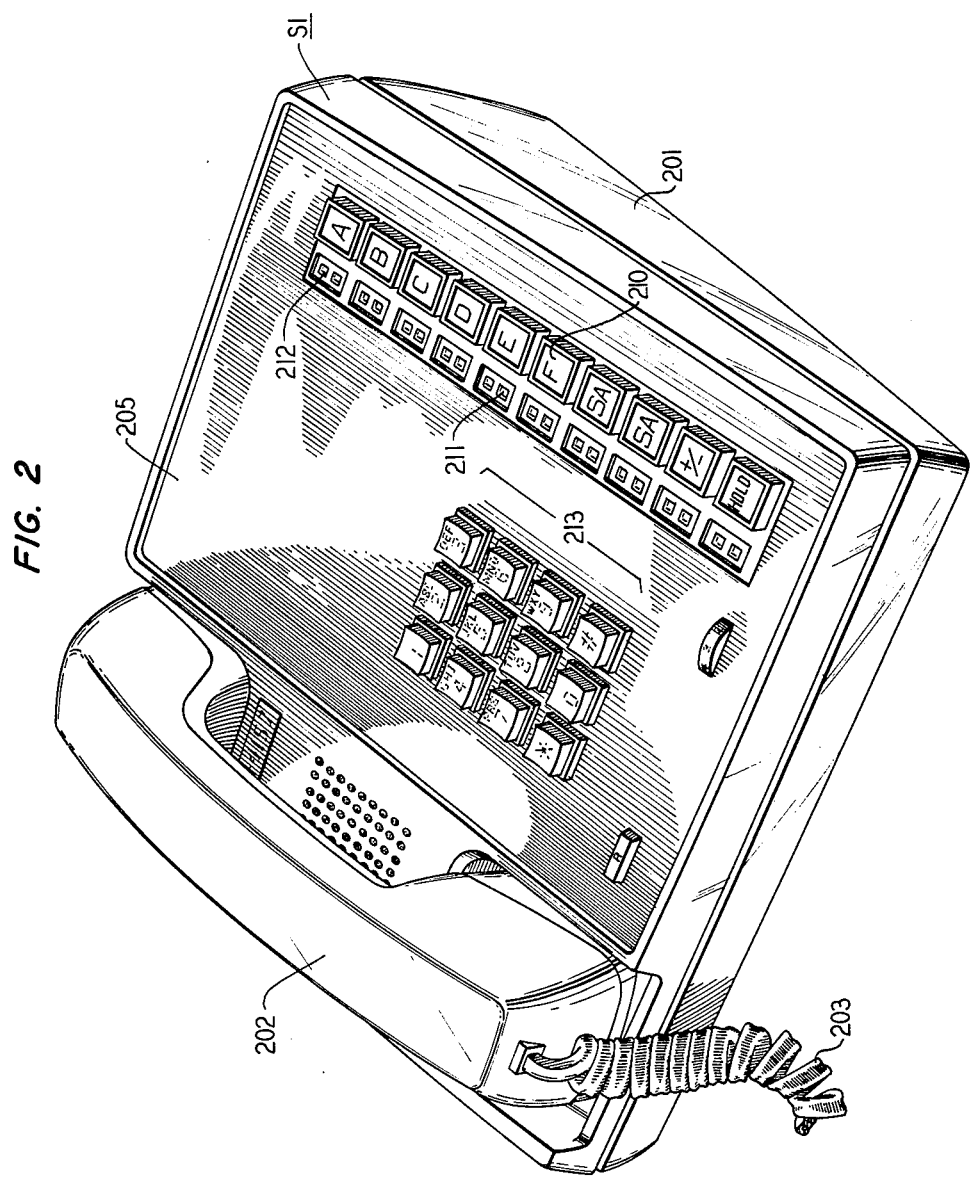
FIG. 2 shows a pictorial representation of a multibutton telephone station set with the +/− button.

This feature provides a red I-Use LED, such as LED 212, FIG. 2, associated with each line access button (system access, pooled facilities access, personal line access, automatic intercom, and call coverage). When off-hook, this LED indicates the line to which the station is connected. When on-hook, this LED indicates the line to which the station would be connected upon going off-hook.

Line Status Indication

Call status indications are given by means of a green status LED such as LED 211, FIG. 2, associated with each line access button (system access, pooled facilities access, personal line access, automatic intercom, and call coverage). The status LED flashes (500 ms on, 500 ms off) during the ringing state, lights steadily during the busy state, and winks (450 ms on, 50 ms off) during the hold state.

Automatic Intercom

Automatic intercom is provided by a 2-way point-to-point voice path between two designated MET stations with automatic signaling of the called station. Upon depressing an automatic intercom button and going off-hook, the calling station user hears ringback and the called station receives the standard station-to-station distinctive alert. The status LED associated with the automatic intercom button is steady at the calling station and flashing at the called station. The called station user may answer the call by depressing the automatic intercom button and going off-hook.

Call Coverage

Call coverage is associated with a group. Each station has the option of being a sender into a given group. As a sender that station's calls may be answered by coverage buttons associated with that group. In addition, each station has the option of being a coverage position for one or more groups—one equipped with a COVR button (or buttons) to answer calls directed from senders into the group (or groups). The status LED associated with a COVR button a each coverage station flashes whenever a station-to-station or attendant extended call is ringing at a sender station into the group. Call coverage is provided to personal line calls only if the principal station (the single station designated principal owner of that personal line) is a sender for the group. If a coverage station answers the call by depressing COVR and going off-hook, the associated status LED will indicate busy and all other COVR buttons will go idle (free to track new calls). The sender station whose call was answered will also receive a busy status indication on the line that was ringing, and it may bridge onto the call at any time by selecting that line.

If two or more eligible calls are ringing within the coverage group, the first coverage button of this group on a station will track whichever call was first to start ringing, the second coverage button of this group on the same station, if it exists, tracks the second call, etc. If calls directed to a station have no idle button appearance on which to terminate, busy tone will be given to the caller and this feature will not be invoked.

A station may cover for several groups by having a separate call coverage button for each group; however, a station can only send into one group. Each coverage group may have up to 8 coverage positions (i.e., 8 coverage buttons may be defined to any given group).

Ring Transfer

Ring transfer is accomplished by equipping any sender station into a Call Coverage group with a RING TRFR button to transfer audible ring to predetermined Forwarding Destination stations having coverage buttons for the associated group after a single burst of ringing. Depressing the RING TRFR button will activate this feature and light the button's status LED.

Once activated, the feature will transfer ringing on any future call directed to the station. The feature is deactivated by a second push of the RING TRFR button. Except for the audible ring at the Forwarding Destinations, such calls are treated exactly as with basic Call Coverage. Any or all stations having coverage buttons for the group may be designated as Forwarding Destinations for this feature as well as Call Coverage on Busy and Call Coverage on Don't Answer.

Any sender station into a Call Coverage group may elect to have this feature. Calls directed to an idle button appearance on the sender station, while that station is busy on another line, will start ringing at predetermined Forwarding Destination stations for the associated group after a single burst of ringing at the sender station. Calls directed to the sender station and left unanswered for 1 to 15 rings (option) will transfer ringing to predetermined Forwarding Destination stations for the associated group. Except for the audible ring at the Forwarding Destinations, such calls are treated exactly as with basic Call Coverage. Any or all stations having coverage destination for the group may be designated as Forwarding Destinations for this feature as well as Call Coverage on Don't Answer and Ring Transfer.

Plus-Minus Conference

By means of the plus/minus button, any station user may combine up to four separate calls into a single conference call-provided no more than two outside calls are involved. The conference may be established by placing and holding each individual call and then adding them together upon reaching the final party. Alternatively, idle lines may be added directly to the active call. Adding a held or idle line to an active call is achieved by depressing the plus/minus (+/−) button and then depressing the held or idle line button. All line appearances associated with an active conference have busy status and active I-use (red LED) indications. Any attempt to add a sixth station to the conference will be ignored by the system.

The station user may hold a conference (without breaking the talking path between the held parties) by depressing the HOLD button, and may reenter a held conference by depressing the line button associated with any of the held parties. The originator of a conference may selectively drop an active conferee by depressing the plus/minus button and then depressing the line button of the party to be dropped. Hanging up or selecting another line while active on a conference will terminate the station user's participation in the conference and transfer supervision to other internal stations associated within the conference. If no other internal station is available to assume supervision, the call is terminated unless there is a progress tone (ringback, busy, reorder) on the call.

The status LED associated with the plus/minus button is lighted whenever the plus/minus button is activated and is extinguished by any subsequent line button depression—including plus/minus and the switchhook.

Distinctive Alert

Distinctive alerting allows the station user to distinguish between incoming CO calls and incoming station-to-station calls. One tone is used as the alert for incoming CO calls extended by the attendant or on a personal CO line. A second higher frequency tone serves as the audible alert for station-to-station (intercom) calls. Each of these signals has a repetition period of 4 seconds with a 1-second on-time and a 3-second off-time.

Manual Exclusion

This feature allows the station user equipped with an exclusion button to exclude the answering position and others from bridging onto an existing call and also drops those stations already on the call. This feature may be cancelled manually by a second depression of the exclusion button permitting bridging, or canceled automatically by going on-hook. The manual exclusion status LED is lighted steadily whenever the feature is active on a nonheld call. When the call is held, exclusion remains in effect and the status LED of the exclusion button winks until the call is reentered by the holding party. This feature can be applied to only one call at a time. Stations excluded from a call hear silence and can receive no I-use indication on the excluded line.

After this feature is activated, the controlling station may use the conference feature to add selected internal stations into an "excluded" outside call. However, other stations cannot add any parties to this call.

Personal Line Access

This feature provides a communications channel between a station user and a dedicated outside line via the switching network. Unlike pooled facilities, which can also be accessed by dial codes, personal lines are only accessible by means of a dedicated access button, which provides incoming as well as outgoing service.

A personal line may be shared by as many as eight stations by providing each of these stations with the associated personal line access button. Because of the conference limit, however, no more than five parties may be on any given call. Any attempt by a sixth station to bridge on will be ignored (i.e., handled as an excluded station). Full common audible ringing may be provided optionally to any or all stations sharing the line. Control of the line with respect to call coverage features is available to only one designated station.

Pooled Facilities—Button Access

Upon depressing a pooled facilities access button and going off-hook, the station user is connected to an idle line facility belonging to a common pool of outside lines (e.g., CO, FX, WATS, etc.). The status and I-use LEDs associated with the pooled facilities access button will light steadily, and the station user will be free to complete the call. If no idle facilities are available (facilities busy indication), a user's attempt to originate will simply be denied and the I-use indication will be extinguished. A station requiring button access to several line pools may be equipped with a separate access button for each of the required pools. Each line pool may optionally be assigned a dial access code, permitting selection of an idle line from the pool by dialing the code after having originated on a system access button. Reorder tone will be returned if no lines in the selected pool are idle.

Facilities Busy Indication

This feature keeps the station user informed of the availability of any of the idle lines in any pooled facility group accessible to the station by means of a pooled facility access button. The status LED associated with a pooled facility access button will indicate busy whenever all the lines within the associated pool are busy, as well as when a line in the pool is being used at a given station.

Pooled Facilities—Dial Access

Upon selecting an idle system access button and dialing the appropriate access codes (9 or 10X), a station user will be connected to an idle line facility belonging to a common pool of outside lines (e.g., CO, FX, WATS, etc.). The status and I-Use LEDs associated with the system access button will be lighted, and the station user will be free to complete the call. If no idle facilities are available, the user's attempt to originate will be denied and reorder tone will be given. This feature is intended for nonbutton sets and MET sets not provided with an appropriate pooled facility button.

Prime Line Preference

This feature automatically connects the station user, upon going off-hook, to the line designated as the prime line. A station user may override this preference by preselecting another line or depressing the HOLD button prior to going off-hook. If ringing line preference is also in effect at a given station, that feature takes precedence.

Ringing Line Preference

For an on-hook station, this feature automatically selects a line access button which has a call ringing the station set. If two or more lines are ringing simultaneously, the station user is connected to the first line to start ringing. If the user wishes to use a different line, the line must be preselected prior to going off-hook. Once a station is off-hook, ringing line preference will be canceled on any subsequent call until the user returns to the on-hook state. If ringing ceases while the station user is still on-hook, line preference reverts to whichever option is applicable—no line or prime line.

Station Call Transfer

By means of the plus/minus button, any station user may transfer any call to any station. Transfer may be achieved by holding the call to be transferred, placing a call to the desired station, depressing the plus/minus button, depressing the button associated with the held call, and then hanging up. Alternatively, an idle button may be plussed directly to the active line, after which the desired party may be dialed. A call transferred from one station to another and left in the ringing state for more than 120 seconds will be terminated if the transferring station is no longer active. This prevents an unmonitored transferred call from indefinitely typing up the system and the CO facilities.

Station-to-Station Calling

This feature allows a station user to directly dial other stations within the system without the assistance of the attendant. This is accomplished by selecting an idle system access button and dialing the intercom code of the desired station.

Other communication systems in which these features could be used are shown in U.S. Pat. No. 3,660,611 issued May 2, 1972 in the name of Knollman et al, and in U.S. Pat. No. 4,046,972 issued Sept. 6, 1977 in the name of Huizinga et al, which patent also shows the multibutton electronic set. The switching network and line circuits shown in FIG. 1 can be of the type shown in U.S. Pat. Nos. 3,991,279 and 3,991,280, both issued Nov. 9, 1976, and in copending application of J. J. Shanley, Ser. No. 846,162, filed on Oct. 27, 1977, now U.S. Pat. No. 4,110,566.

GENERAL DESCRIPTION

Example of Conference Operation

An electronic key telephone set as shown in FIG. 2 with nonlocking buttons is used. There are two LED lamps associated with each button: a red I-USE LED 212 to indicate if the station user is active on a talking button, and a green STATUS LED 211 to indicate the status of the facility associated with the button, (e.g., busy, idle, etc.). One of the buttons is designated as a plus/minus (+/−) button. It takes two button pushes to activate a +/− conference operation. First, the +/− button is depressed, then, a talking button is depressed to "+" or "−" the facilities associated with that button to an existing call.

When the +/− button is depressed, the green status LED of the +/− button is turned steady on to indicate that the +/− feature is being activated and the next depression of a speech-type button will complete the operation. However, under two situations, the +/− button depression will be ignored, i.e., the green LED will not be turned on. These situations are (1) the station is on hook, or (2) there is no I-USE red LED turned on at the station set. Both of these conditions indicate that the station is not active on an existing call. Since the +/− operation is designed to "+" or "−" a party (parties) from an existing call, no action should be taken if the station is not active on any line.

If, after the +/− button is depressed and its green status LED is turned on, (1) the station goes on hook: then the +/− status LED will be turned off and the +/− operation is terminated, or (2) an idle (status green LED=off) talking button is depressed: then a new call origination is "plussed" onto the existing call the station has been active on, or (3) a non-idle (status green LED is on or winking to indicate hold) speech-type button is depressed: then, if the station was not active on the button (red I-USE LED was off), the call behind this button is added to the existing call the station is active on, or if the station was active on this call (red I-USE LED was on), then the parties behind this button will be "minused" from the call the station is active on, or (4) a non-speech-type button (e.g., hold button) is depressed: then the +/− operation will be terminated and the green status LED on the +/− button will be turned off.

Action (4) is provided to correct an accidental depression of the +/− button. Furthermore, to minimize accidental "minus" operation, when a "minus" request is made by the station, it will be denied if the button to be minused is the only button the station is active on, since the station user could accomplish the same result, i.e., termination of the call, simply by going on-hook.

DETAILED DESCRIPTION

In the status memory (FIG. 1, item 16) there is stored for each button on each station set the following information:

(a) the instantaneous state of each LED (on/off) for the two LEDs associated with the button;

(b) the long term state of each LED (flash, wink, on, off). This is called the Station Button Status (SBS) for the status LED and the Station Button I-use (SBI) for the I-use LED.

Also, for each station set, there is a status memory location for recording:

(c) the last detected instantaneous state of the station's switchhook and buttons;

(d) the desired state of the station's tone ringer (on/off, volume setting, frequency setting).

Periodically, the processor (FIG. 1, item 15) takes the information in (b) and uses it to update the instantaneous information in (a).

Periodically in the scan cycle, the processor takes the information in (a) and (d) and assembles it into a single long message for a single station in the format required by the MET station set. This data is transmitted to the MET using the data interface (FIG. 1, item 17). The MET returns to the processor, via the data interface, the instantaneous state of its switchhook and buttons.

The returned data is compared with that in (c) above and if there are any changes, records these in a temporary buffer for that station. At a different time, another processor action called Process picks up this stimulus and causes the appropriate feature actions to be initiated in response to that stimulus.

Whenever the processor program wishes to turn on or off an LED on a MET, or set it to wink or flash, it writes the appropriate bits into the status memory described in (b) and this function will automatically occur as a consequence of the two periodic actions described above.

For each button, there is a translation record stored in the translation memory (16-2 of FIG. 1) SBID (station button identification), to identify the type of button. This information is coded in numerical form, e.g., a value of 1 identifies a personal line button, a value of 2 identifies a pooled line button, etc.

For a speech-type button (e.g., system access, autointercom, person line, pooled line, call coverage, etc.), there are 4 possible states which will be shown to the user on the status LEDs: Namely, busy—(LED steady on), idle—(LED dark), ring—(LED flash), hold—(LED wink).

This information is stored in the status data memory (16-2 in FIG. 1) coded in numerical forms. For a non-speech-type button like message-waiting, the same data format is used although the valid states may reduce to 2 (busy and idle).

As described early, the scan routines in the system detect and report a button push by the MET user to a buffered area to wait for the process routines to process. When such a change is processed by the process routines, the button identification information, SBID, stored in 16-2 is first checked, then the button status information, SBS, stored in 16-2 is checked. The processor is thus able to interpret the button push to a specific user command and uses the proper programs stored in 16-1 to process the change. For example, button selection of (1) an idle (from SBS) speech-type (from SBID) button implies call origination requiring the associated facilities.

(2) a ringing (from SBS) speech-type (from SBID) button implies answer a ringing call.

As discussed above, the +/− operation consists of two steps:

(1) depression of the +/− button, and (2) depression of a talking button. Note that the common point in these two steps is "depression of a button".

In the processor controlled system shown in FIG. 1, when a button is depressed, it is sensed by the processor through the data bus via the interface units. This information is collected by the scan subroutines and the raw data is stored in the temporary data area in the random access (status) memory, identifying which button on which set has been depressed. Later in the work cycle, the processor calls a station button processor subroutine to process this raw data as discussed above.

Before describing the detailed system operations, a new concept developed to implement the conferencing feature, call group, will be explained. A call group is established whenever a new call is originated, either by a station origination request or by a C.O. incoming seizure request. A conference call is a collection of several call groups whose members are connected to the same link, and the conference control operations are operations manipulating the call groups as should become obvious when the detailed system operations are described.

Figure 3:
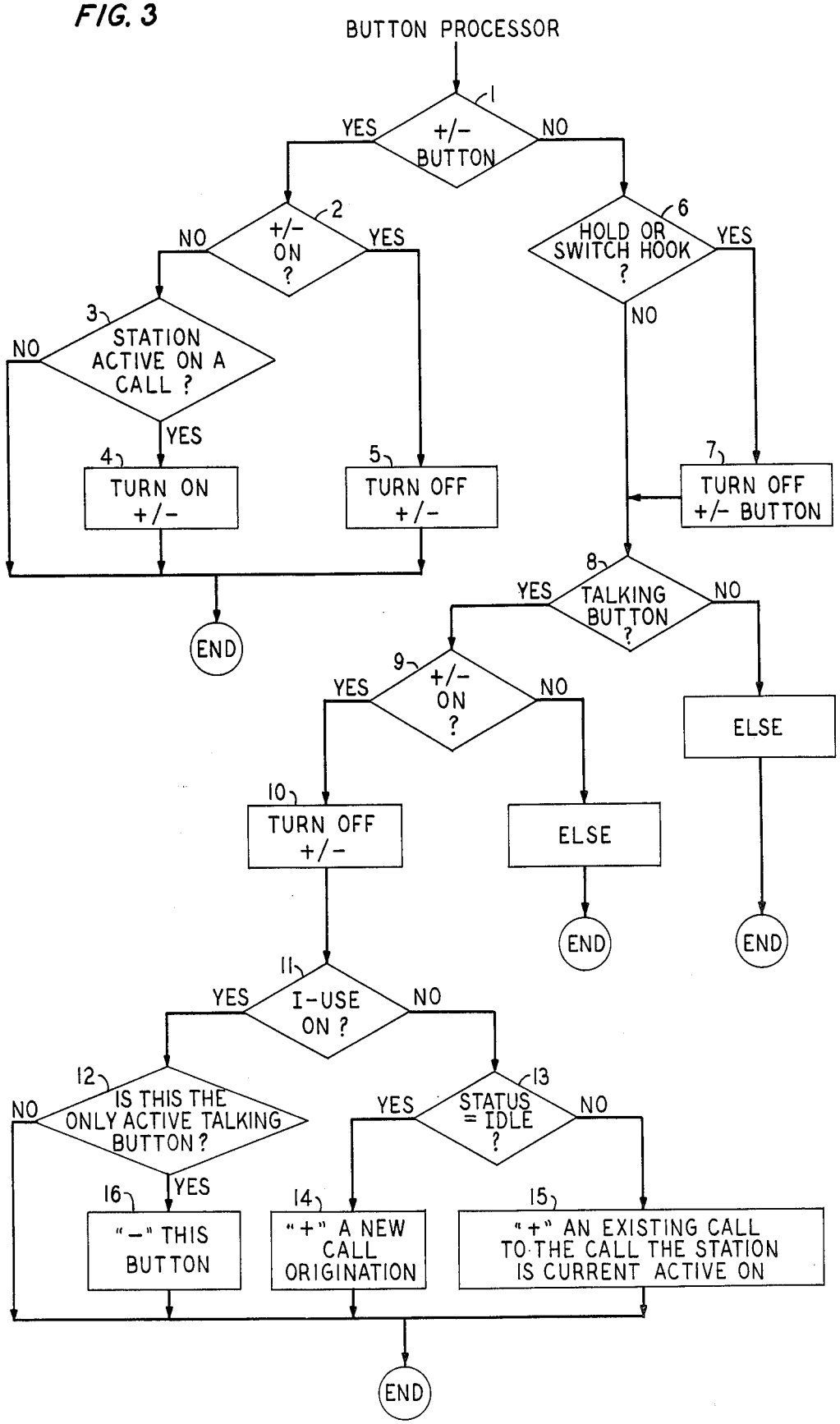
FIG. 3 shows a flow chart of typical system operation.

FIG. 3 shows the parts of the Button Processor which implements the +/− operation. In FIG. 3, there are 2 actions marked "Else". They are processes unrelated to the +/− function and thus can be ignored here.

FIG. 4 shows the station data information needed to implement the +/− operation:

(1) SS: Station Status which indicates if the station is on/off hook, and if the +/− button is on/off.

(2) SBS: Station Button Status which indicates the status of the green LED associated with a station button.

(3) SBI: Station Button I-USE information which indicates if the I-USE LED of a station button is on/off.

(4) SBLP: Station Button Link Pointer which stores the link number associated with a station button. It also stores the call group number.

(5) SBID: Station Button Identification which identifies the button assignment.

Information (1)–(4) above are in status data, while information (5) is in translation data.

As mentioned early, a conference call is a collection of call groups whose members are connected to the same link. Information about which facilities are in a call group and to which call groups they belong is stored in the status data memory labeled NLST, as shown in FIG. 5. For each link, there are 5 slots, where 5 is the maximum number of conferees allowed. Each slot, if occupied, is dedicated to a facility connected to this link. Information stored in the slot consists of:

(1) The ID number of a facility, which identifies the facility type (station, line, etc.) and its unique internal index.

(2) The call group to which the facility belongs.

Referring to FIG. 3, when the station user first depresses the +/− button, the Button Processor will go through decision 1, 2, 3 and action 4 to provide the control processor information to turn on the +/− button. Then, when a talking button is pushed, it will fall through to one of actions 14, 15 or 16 to complete the +/− operation.

The decisions which must be made are:

(A) Determining if the button is a +/− button (decision 1)

This is done by using the translation table SBID. Also, if the +/− button is assigned as a fixed button (e.g., button 2 or a specific communication system realization is always the +/− button), then only the button number is needed to determine if a button is the +/− button.

(B) Is +/− ON (Decision 2, 9)

This is done by using the status data SS to check if the +/− button has been turned on at a particular station.

(C) Is this a Hold Button or Switchhook (Decision 6)

The switchhook is assigned a special button number; the Hold Button is assigned as a fixed button. Therefore, from the button number, it can be determined if a particular button is a HOLD button.

(D) Is I-USE on (Decision 11)

This is done by use of the status data SBI.

(E) Is the STATUS IDLE (Decision 13)

This is done by using the status data SBS.

(F) Is the Station Active on a call—(Decision 3)

First, the switchhook status of the station is available in SS. If the station is on-hook, the answer is no. If the station is off-hook, then search the I-USE LED information SBI of all buttons of this station. If any one on them is on, the answer is yes.

(G) Is a button a speech-type button (Decision 8)

This is done by checking the station button identification data SBID of the corresponding button.

(H) Is this the only active button on the set (Decision 12)

This is done by checking the SBI data of all buttons on the set to see if there is another one with I-use LED on.

The Actions which must be taken care:

(A) Action 4: Turn on +/−.

This updates the status data SS to change the station state from +/− off to +/− on. It also updates the SBS table to turn on the green status LED associated with the +/− button.

(B) Actions 5, 7, 10: Turn off +/−.

These are opposite to Action 4.

(C) Action 16: Minus a button.

Figure 6:
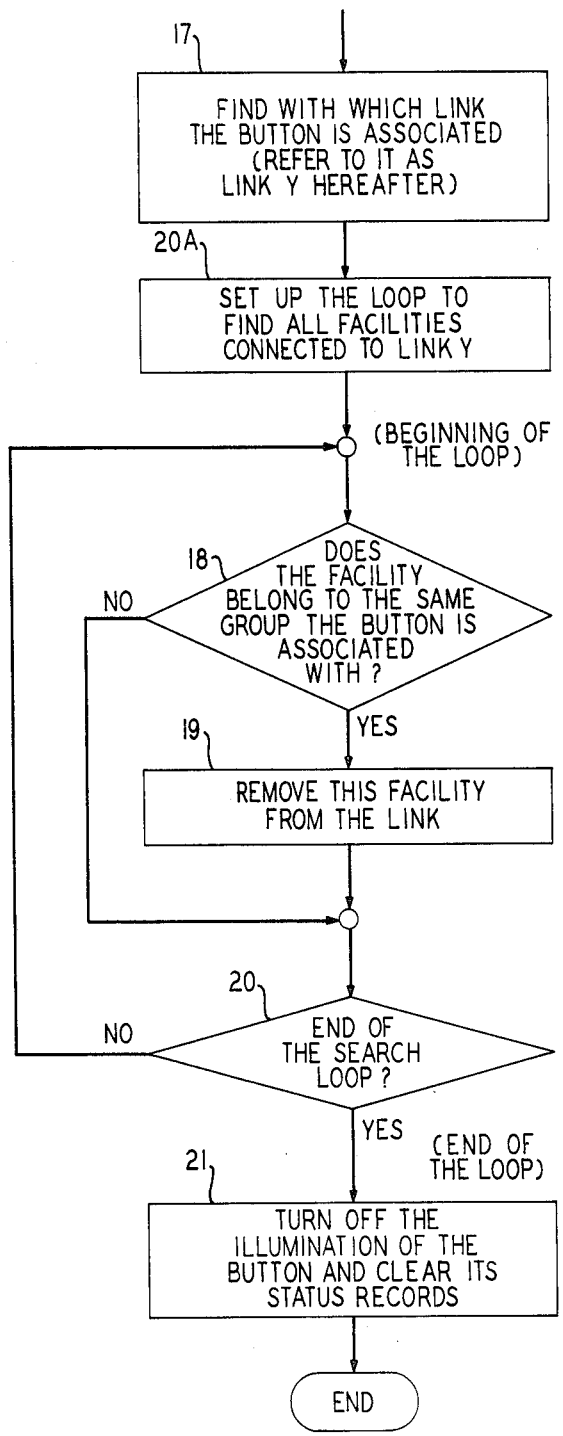
FIG. 6, 7 and 8 are expansion of FIG. 3 to further detail the system operations.

The detailed procedure to implement this action is given in FIG. 6, and will be explained below:

Action 17:

From the status data SBLP of the button to be "minused" the link number with which the button is associated is identified. From this data SBLP we can also identify with which call group on this link (we shall refer to it as link Y) the button is associated.

Action 20A and Decision 20:

This is to set up and test the loop to check the NLST data of link Y, which stores information of the conferees connected to the link.

Decision 18: Does a facility belong to a certain group

The group information stored in NLST is consulted.

Action 19: Remove a facility from a link.

Three actions are involved.

(1) Disconnect the facility from the link (network operation).
(2) Clear entry in NLST associated with the facility.
(3) Update the facility record to show that it is no longer associated with the link (for a station), clear all station records of a button associated with this link through SBLP.

Action 21: Turn off the illumination of a button and clear its status records.

The process routines turn off the illumination by updating the corresponding status data stored in SBS and SBI. Furthermore, SBLP of this button will be cleared to indicate that it is no longer connected to any link.

(D) Action 14: Plus a new call origination

Figure 7:
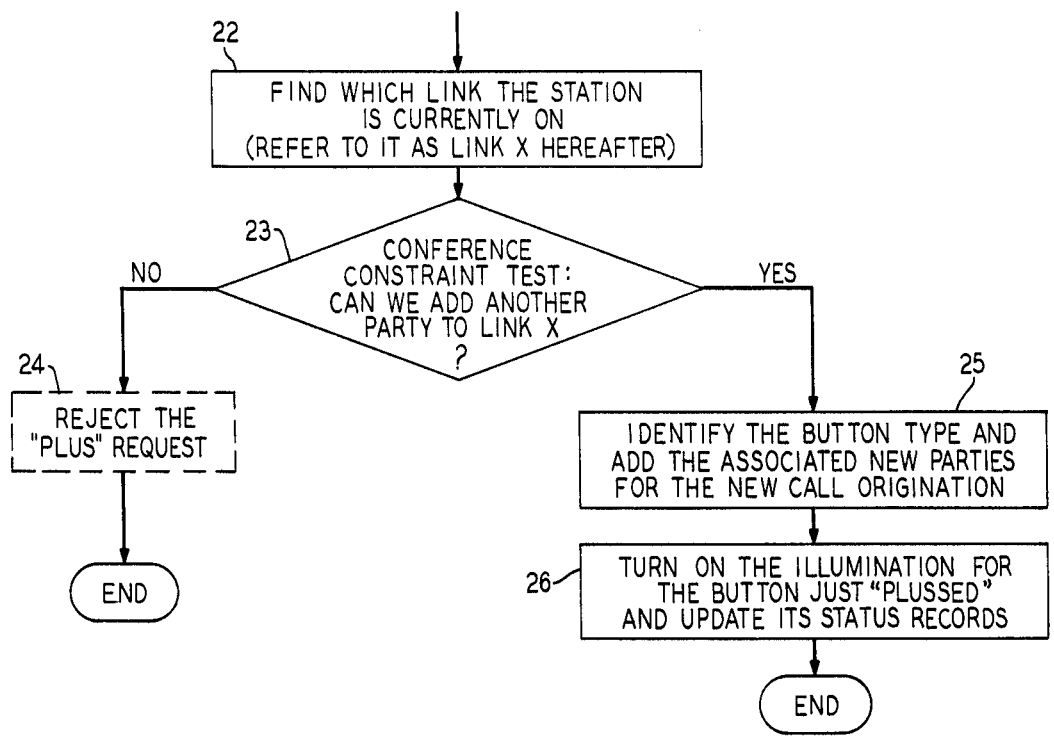

The detailed procedures for this action are summarized in FIG. 7, and explained below:

Action 22: Find which link the station is currently on.

This is done by (1) Find out which button the station is currently busy on (i.e., I-USE LED is turned on).
This is done by searching the SBI data of all buttons of the station.
(2) After that button number is identified, interrogate the SBLP data of that button to find out with which link that button is associated.

Action 23: Conferencing Constraint Test

The conferencing constraints are system parameters chosen by the designers. For example, conferencing on paging calls may not be allowed. The one illustrated here is the maximum number of conferees allowed in a conference call. From the NLST data, the number of conferees can be determined. Then the number is used to check if adding the additional facility (for the new call origination) will exceed the conferee limit.

Action 24: Reject the plus request

This "do-nothing" action is added here for clarity. When the "plus" request is denied, no system action will be taken (e.g., the illumination of the button is to be "plussed" remains unchanged).

Action 25: Add the facility needed for the call origination to link X.

First, the type of the button to be "plussed" is identified from its translation data stored in memory, SBID. If it is a system access button, an origination register will be added to the link; if it is a line button, a line will be added to the link. A new call group number will be assigned to this new call origination and the information stored in NLST together with the unique ID number of the facilities added.

Action 26: Turn on the illumination for the button just "plussed" and update it status records.

This action consists of updating the following status memory associated with the button "plussed".

(1) SBI: To turn on the I-USE.

(2) SBS: To indicate the button status (and thus the status LED) is busy.

(3) SBLP: Store the link number and the group number of this new call origination.

(D) Action 15: Plus a new call to the call the station is currently on.

Figure 8:
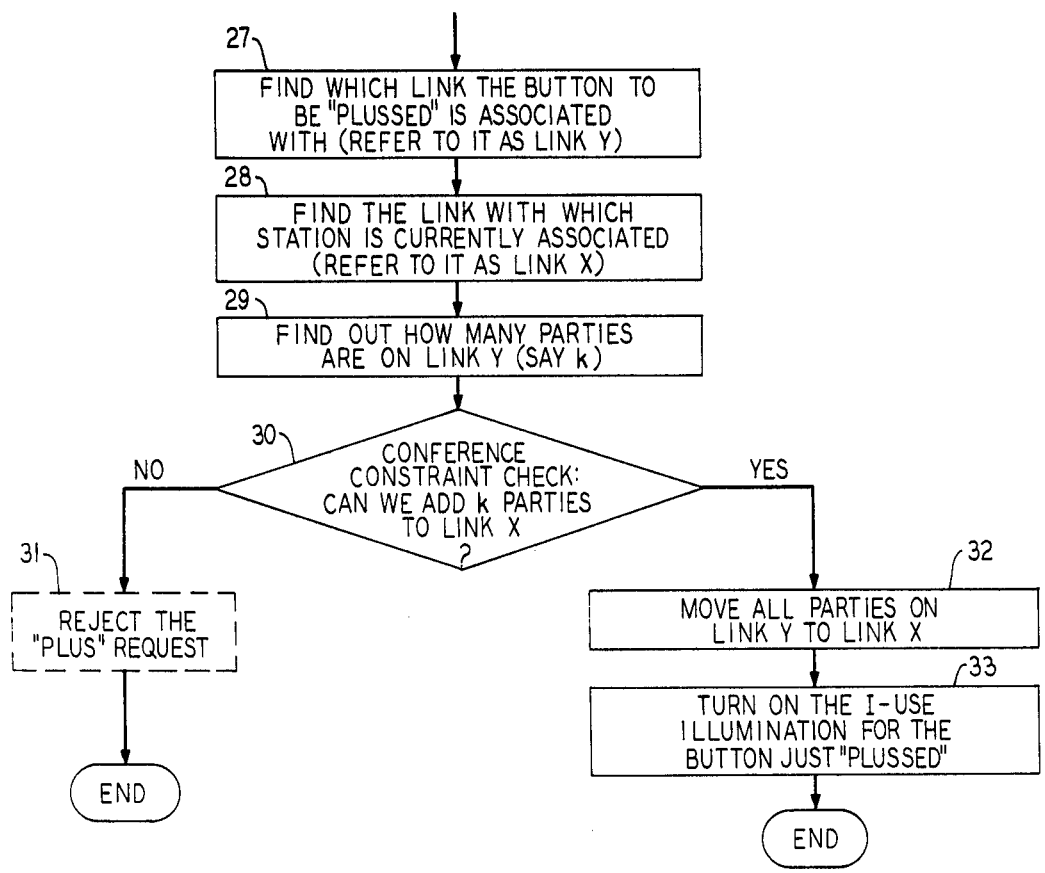

The detailed procedures are summarized in FIG. 8 and explained below:

Action 27: Find which link the button to be "plussed" is associated with.

Action 28: Same as Action 22.

Action 29 and Decision 30: Conferee limit check.

From the information stored in NLST, the processor finds out how many facilities are on link X and how many are on link Y, and determines if the maximum number of conferees will be exceeded.

Action 32: Move all facilities from link Y to link X. This is accomplished though the following steps:

(1) Set up a search loop to find all facilities connected to link Y: same as Action 17.

(2) Find a facility connected to link Y from the NLST data of link Y:

(a) connect this facility to link X (network order).

(b) store its ID number and the call group number in the NLST record associated with link X.

(c) Update its status record to indicate that it is connected to link X instead of link Y—For a station, update all SBLP data which is associated with link Y and the old call group, and change them to store the new link number X.

Action 33: Turn on illumination for the button just plussed and update its status records:

(1) SBS: Store the I-use ON information (and thus turn on the I-use LED).

(2) SBS: Store the information to indicate the status of the button is busy (and thus turn ON the status LED).

(3) SBLP: This information is taken care of by Action 32.

Of course it is to be understood that the arrangements described in the foregoing are merely illustrative of the application of the principles of the present invention. Numerous and varied other arrangments may be utilized by those skilled in the art without departing from the spirit and scope of the invention.

What is claimed is:

1. A communications system having a plurality of stations, each station having a number of buttons operable for establishing communication connections or features to said station, said communications system comprising a switching network having a plurality of links, means responsive to the operation of an idle button for establishing a communication path to an available link of said network and for establishing on said available link a communication path to a selected system facility, means for priming said station to enable a conference connection, means responsive to the enabling of said priming means at said station followed by the operation of an idle button when said station has a communication connection to an active link for inhibiting a communication path connection to a next available idle link and for enabling instead a communication path connection to said currently active link so as to establish a conference connection between said station, said currently active link and said selected system facility.

2. The invention set forth in claim 1 further comprising means responsive to the enabling of said priming means followed by the operation of a button associated with an active link to which said station does not have a communication path for combining said active link with any other active link to which said station currently has a communication path so as to establish a conference between said station, system facilities on said active link and system facilities on said other active link.

3. The invention set forth in claim 1 further comprising means responsive to the enabling of said priming means followed by the operation of a button associated with system facilities active on a link to which said station currently has an established communication path for disassociating said system facilities associated with said last operated button from said active link.

4. The invention set forth in claim 3 further comprising means for determining how many system facilities are currently active on a link associated with said station, and means jointly responsive to the operation of said conference enabling button followed by the operation of a button associated with an active link to which said station currently has a communication path established and to a determination that said link has only one other system facility connected thereto for inhibiting said disassociation means.

5. The invention set forth in claim 3 wherein said priming means is the operation of a conference control button at said station.

6. In a communication system having a plurality of stations each having capability of communicating with other stations over communication links internal to the system as well as having the capability of communicating with stations external to the system over communication lines extended between the system and a central source, an arrangement for establishing conference connections between at least three stations each station having a plurality of nonlocking buttons operable to establish features or communication connections to said station, a switching network having a plurality of communication paths with a single communication path extended to each said station from said switching network, means including the designation of one of said buttons at each said station as a conference control button responsive to the operation of said conference control button followed by the operation of a button associated with an idle system facility for connecting said system facility in common with already active system facilities connected to said station.

7. The invention set forth in claim 6 further comprising means responsive to the operation of said conference control button followed by the operation of a button associated with a currently active communication path for disassociating said communication path from said network.

8. In a communication system having a plurality of stations each having capability of communicating with each other station over communication links internal to the system, an arrangement for establishing conference connections between at least three stations, each station having a plurality of nonlocking buttons operable to establish features or communication connections to said station, said arrangement comprising:

a local switching network having a plurality of links and a single communication path connection extended to each station from said local switching network, means including the designation of one of said buttons at each station as a conference enabling button, responsive to the operation of a communication enabling button at a station for connecting the communication path of said station as well as the communication path of selected facilities to an idle one of said links, means responsive to a calling connection established from said station for connecting the communication path from a called station to the same link to which the communication path of said calling station is currently connected, and means responsive to the operation of said conference enabling button followed by the operation of a button associated with an idle communication facility for inhibiting a communication path connection to an idle link and instead connecting any other communication paths which would be connected to said selected idle link to any link to which the station is currently connected.

9. The invention set forth in claim 8 further comprising means responsive to the operation of said conference enabling button at a first station followed by the operation of a button associated with an established communication lead connection to other stations for disconnecting said other stations from said first station.

10. In a communication system having a plurality of stations and system facilities each station having a plurality of buttons and where each station may establish communication connections to any other station or system facility, means, including a designated button at at least one of said stations, for establishing conference connections among said stations or system facilities, said conference establishing means including means for establishing a first connection to at least one other station or system facility under control of a first button at said station, p1 means for placing any said established connection in the hold state, means for establishing a connection to a second station or system facility under control of a second button at said station while a first connection is in the hold state, and means responsive to the operation of said conference connection designated button while said second station or system facility connection is established and not in the hold state followed by the operation of said first button for connecting in common the communication paths of both said established connections.

11. The invention set forth in claim 10 further comprising means responsive to the operation of said conference connection designated button while a conference connection is established via said first and second buttons followed by the operation of either said first or said second button for disassociating the station or system facilities associated with said last operated button from said conference connection.

* * * * *